United States Patent [19]

Vicic et al.

[11] 3,945,966

[45] Mar. 23, 1976

[54] VULCANIZATION OF FLUOROALKOXYPHOSPHAZENE POLYMERS

[75] Inventors: John C. Vicic, Painesville; Richard W. Sicka, Brecksville, both of Ohio

[73] Assignee: Horizons Incorporated a division of Horizons Research Incorporated, Cleveland, Ohio

[22] Filed: May 29, 1974

[21] Appl. No.: 474,320

[52] U.S. Cl............ 260/42.15; 260/2 P; 260/42.29; 260/874; 260/901
[51] Int. Cl.²......................................... C08K 9/06
[58] Field of Search....... 260/2 P, 42.29, 874, 42.15

[56] References Cited
UNITED STATES PATENTS
3,539,488  11/1970  Klopfer............................ 260/42.29

3,751,378  8/1973  Cowperthwaite et al........ 260/42.29

*Primary Examiner*—James H. Derrington
*Attorney, Agent, or Firm*—Lawrence I. Field

[57] ABSTRACT

The properties of fluoroalkoxyphosphazene polymers are improved by compounding the polymers with certain fillers some of which may be reactive, a class of polyfunctional coagents, a vulcanizing agent and possibly other additives and thereafter vulcanizing the resulting compositions. The resulting vulcanizates have improved properties and extend the utility of the phosphazene polymers for use as mechanical goods, seals, O-rings and gaskets for extreme service environments.

19 Claims, No Drawings

VULCANIZATION OF FLUOROALKOXYPHOSPHAZENE POLYMERS

The invention herein described was made in the course of or under a contract with the Department of the Navy.

This invention relates to polyphosphazenes which consist essentially of chains of alternating P and N atoms, the P atoms having attached thereto two substituent groups represented as (OR) in which the substituents may be either the same or may be different and the substituent groups may be more numerous than 2.

More specifically, it relates to the improved polymers which are obtained by compounding and vulcanizing such polyphosphazenes.

The invention is particularly applicable to fluoroalkoxyphosphazene polymers and will be described with reference to such polymers, but it is to be understood that it is applicable to other polyphosphazenes.

The polyphosphazenes which the present invention seeks to improve are those described in U.S. Pat. Nos. 3,515,688 issued June 2, 1970; 3,702,833 issued Nov. 14, 1972 and elsewhere.

The polymers described in U.S. Pat. No. 3,515,688 are high molecular weight, elastomeric, chemically and thermally stable, phosphazene polymers with low glass transition temperatures. U.S. Pat. No. 3,702,833 describes improved phosphazene copolymers wherein a terpolymer is generated with the ter-radical being an especially reactive moiety, as an unsaturated monovalent radical.

The principal object of this invention is to provide compositions based on said polymers and with greatly enhanced properties.

Another object of the invention is to provide compositions suitable for vulcanization and to produce useful crosslinked materials.

It is a further object of this invention to define the use of suitable coagents and vulcanization modifiers to improve the physical and mechanical properties of the polyphosphazene polymers and to improve the modulus and compression set properties of said vulcanized polymers.

It is a further object of this invention to define vulcanizable compositions comprising poly(fluoroalkoxyphosphazene) polymers, silane treated inorganic fillers, vulcanizing agents, and cure modifiers which produce useful novel vulcanizates with valuable properties of low temperature flexibility, fluid, lubricant and oil resistance; improved high temperature compression set and thermal stability; and resistance to high relative humidity.

It is known that phosphonitrile fluoroesters can be compounded and vulcanized, e.g., as described in U.S. Pat. No. 3,271,330 issued Sept. 6, 1966.

Various methods can be used to vulcanize polyphosphazenes to produce crosslinked materials, These include the use of various peroxides and metal oxides such as magnesium oxide. However, heretofore known procedures do not produce the best properties desirable for useful and practical products and items of commerce. The present invention describes preferred compositions which, when vulcanized, exhibit useful properties of tensile strength and low compression set at use temperatures after exposures to or in the presence of fluids, high relative humidity, lubricants, oils and fuels.

Briefly stated, the invention resides in the compounding of such polyphosphazenes with fillers and curing agents and other additives selected to provide the improved properties and to provide for their retention.

The polyphosphazenes exhibit low tensile strengths, and high elongations as raw gums. By the practice of this invention compounded stocks are obtained which exhibit tensile strengths of 1100 to 2200 psi and elongations of 50 to 300 percent, and which retain these properties under fluid aging, thermal aging in air and extended exposure to high humidity environments and to ASTM test fuels and are therefore useful as gaskets, seals and O-rings.

Cured polymers and copolymers prepared in accordance with the present invention have shown some thermal stability after prolonged aging at 350°F and substantial property retention even at 392°F. In the presence of synthetic hydraulic fluids and petroleum and synthetic oils at temperatures of 300°F and 350°F, physical property values have been retained at near original values on extended aging even though the fluids and oils themselves were subject to decomposition. Vulcanizates retained high tensile strength and elongation after 888 hours in water at 212°F (100°C) and 100 percent relative humidity. After aging 300 hours in JP-4 jet fuel, only minor change in physical properties was observed. After 3000 hours in ASTM fuels at room temperature, little change in hardness or volume of the vulcanizates was observed. These results establish the utility of compounded poly(fluoroalkoxyphosphazenes) for use as O-rings and gaskets/seals in extreme service environments.

The invention will be further apparent from the description which follows in which specific examples of the invention and its practice are set forth.

1. ELASTOMER

The elastomeric polyphosphazenes to which the present invention is applicable are those described in U.S. Pat. Nos. 3,515,688 and 3,702,833, noted above, and elsewhere in the literature. These polyphosphazenes may be represented as consisting of randomly distributed repeating units having the following formulae:

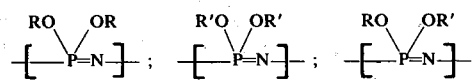

in which for homopolymers both the OR and OR' groups are identical, for copolymers OR and OR' are different from each other and for other colymers there may be three or more different groups attached to the phosphorus atoms in the polyphosphazene chain. Suitable groups are described in the above noted patents.

Particularly preferred groups are fluoroalkoxy groups represented by the following formula, $Z(CF_2)_nCH_2O—$ in which Z represents H or F and n is an integer from between 2 and 9.

Other suitable OR groups include aryloxy, e.g.: cresyloxy, guaiacoxy and hesperetoxy.

For purposes of illustration, the invention is described in the Examples which follow in reference to improvements in the properties of a specific copolymer identified by the formula:

in which the two substituents were present in approximately equimolar proportions.

This copolymer was prepared by the following procedure:

The fluoroalkoxides were prepared in dry tetrahydrofuran by sequential addition of $CF_3CH_2OH$ (25 mole % of excess over polymer) and $HCF_2C_3F_6CH_2OH$ (25 mole % excess over polymer to sodium—5 mole % excess over polymer). Higher or lower excesses of reactants can be employed. The $CF_3CH_2OH$ was added at reflux, the mixture was cooled, and $HCF_2C_3F_6CH_2OH$ was added and reacted taking care that the temperature did not exceed 25°C. Both fluoroalcohols may be added together if care is taken to keep the temperature below 25°C. Purified hexachlorophosphazene was polymerized in bulk and $[Cl_2PN]_n$ polymer dissolved in dry benzene (approximately 10 weight % solution). The $[Cl_2PN]_n$ polymer solution was added over a period of several hours to the solution of the fluoroalkoxides maintained at 35°C or below. The reaction mixture was stirred overnight at room temperature and was washed with isopropanol/benzene (1v/2v) to remove soluble materials. The copolymer was freed of chloride ion by exhaustively washing with isopropanol (1v/2v), until $AgNO_3$ gave a negative test.

Terpolymers may be prepared in similar fashion. The termonomer component is added as the appropriate alcohol along with the fluoroalcohols or in separate addition to the suspension of sodium in tetrahydrofuran. The $[Cl_2PN]_n$ polymer solution is added and the product is purified as described above.

2. COMPOUNDING

Compounding of the polymer was effected by incorporating one or more of the following classes of additives into the elastomer:
 a. Fillers;
 b. Stabilizers;
 c. Vulcanizers; and
 d. Coagents.

The procedure for preparation of the various compositions of vulcanized polymer was as follows: Polymer and various solids (i.e., fillers, activators, etc.) were dried when possible with heat under vacuum for 24 hours to remove entrained solvent and/or water which may have been present. A masterbatch was formulated by simple mixing of the selected dried additives. The polymer was reduced to small chunks and blended (mixed) with the master batched fillers and metal oxides, extruded from the mixer and placed on a rubber mill to remove entrained air and to achieve further mixing. The composition was bin aged one day and the vulcanizing agents were blended into the mix on the rubber mill and the stock was sheeted. In certain cases, processing was accomplished as soon possible. Additional bin aging of peroxide stocks merely required a subsequent freshening on the mill before sheeting and molding. Bin aging or stocks in excess of 40 days has had no deleterious effect on physical properties. A precut shape was introduced into a preheated mold. The usual mold release agents, such as silicone or Teflon types, were useful to promote release of the vulcanizate from the mold. However, such mold release agents are not essential to the formation of good moldings. Post cure was accomplished in a circulating air oven.

The poly(fluoroalkoxyphosphazene) elastomers appear to have an ability to accept large proportions of fillers and mill blend readily with such large quantities not commonly exhibited by other extreme service polymers.

a. Fillers

Fillers are added to the polyphosphazene elastomers to reinforce them, or to increase the hardness of the polyphosphazenes, or merely to decrease the cost of the final product. Fillers which have been successfully incorporated in the poly(fluoroalkoxyphosphazene) include carbon blacks, silicas, aluminum silicates and microcrystalline quartz.

Of these fillers, the organosilane modified aluminum silicates are preferred because they appear to provide the best balance of vulcanizate physical properties. The organosilane treatment is believed to enhance the phosphazene elastomerfiller bonding with subsequent improvement in mechanical properties. Also, retention of vulcanizate mechanical properties on thermal aging appears to vary depending on the particular silane used in the filler treatment.

b. Stabilizers

Like many other known synthetic resins, the poly(fluoroalkoxyphosphazenes) utilized in the present invention are subject ot degradation when exposed to heat, light, and various active chemicals. In order to scavenge the halogen or halogen compounds or other acidic materials which may be released during vulcanization, it has been found desirable to include a base such as $MgO$, $ZnO$, $ZrO_2$ or other metal oxides, such as $BaZrO_3$ as acid acceptors.

c. Vulcanizers

Preferred materials which have been added to accomplish vulcanization include peroxy compounds such as:
 dicumyl peroxide;
 benzoyl peroxide;
 2,5-bis(t-butylperoxy)2,5-dimethylhexane;
 2,5-dimethyl-2,5-bis(t-butylperoxy)hexyne-3; and
 1,1-bis(t-butylperoxy)3,3,5-trimethylcyclohexane.

These materials are included in the composition, usually as an active material on an "inert" solid carrier such as aluminum silicates, clays or metal carbonates. Other peroxides or mixtures of peroxides may be used.

d. Coagents

Finally, and of particular significance, in the compositions of this invention, are coagents, unsaturated organic compounds which contain vinyl, allyl, propenyl, acrylate or methacrylate or other unsaturation on aliphatic, aromatic or heterocyclic nuclei. Two particularly preferred coagents are triallylcyanurate or trimethylol propane trimethacrylate. These compounds appear to aid the crosslink reaction for poly(fluoroalkoxyphosphazene) polymers and thereby produce vulcanizates with enhanced physical properties and with superior stability as compared with the properties exhibited by otherwise identical products, except that the coagents have not been included. While not wishing to be bound by any specific explanation, it would appear that the multifunctionality of the coagent permits generation of a network of greater crosslink density per unit of polymer chain.

e. Other agents

Other agents may be added to provide some plasticizing or other effects desired in the vulcanizate.

3. Proportions

In general, the proportions of the above noted additives may vary over a considerable range depending on the presence or absence of others of the additives in the composition and depending on the intended final use of the composition.

Table I sets forth ranges found to be satisfactory for seal materials, gaskets, and O-rings; in parts by weight per 100 parts of poly(fluoroalkoxyphosphazene).

Table I

| Additive | Range | Preferred Range |
|---|---|---|
| Fillers | 20 to 150 | 30 to 110 |
| Vulcanizers (as active mat'l) | 0.1 to 10 | 1.5 to 3 |
| Coagents | 0.1 to 20 | 1.5 to 6 |
| Antioxidants | 0.01 to 10 | 3 to 6 |
| Stabilizers | 0.01 to 10 | 3 to 6 |

The curing and post curing properties of the vulcanizates are improved by curing at temperatures between about 225°F and 350°F for up to 30 minutes, and by post curing at between 150°F and 300°F for between about one hour and 48 hours or longer.

The invention will be more clearly understood from the examples which follow in Table II and set forth by way of illustration of the practice of this invention and which are not intended to limit the invention.

In Table II and the tables which follow various additives are indicated by either chemical names or by tradenames. The tradenames are intended to designate the following:

Burgess KE is an anhydrous aluminum silicate treated with vinyltris(2-methoxyethoxy)silane.
Nulock 321SP is an anhydrous aluminum silicate treated with gamma-aminopropyltriethoxysilane.
Optiwhite P is a calcined aluminum silicate.
Elastomag 170 is a high activity magnesium oxide.
Silanox 101 is a hydrophobic fumed silica.
Chemlink 30 is a trimethylol propane trimethacrylate coagent.
Dicup 40KE and Luperox 500/40KE are both 40% active dicumyl peroxide on Burgess KE.
Lucidol 78 is benzoyl peroxide wet with water.
Aerosil 200 is a hydrophillic fumed silica.

Table III presents data on retention of physical properties after extended exposure to Jet Fuel.

Table III

JP-4 Fuel Immersion of a $[(CF_3CH_2O)_2PN-(HCF_2C_3F_6CH_2O)_2PN]_n$ Vulcanizate at 239°F (115°C)

| | 0 Hrs. | 24 Hrs. | 120 Hrs. | 312 Hrs. |
|---|---|---|---|---|
| Tensile Strength (psi) | 1660 | 1522 | 1365 | 1153 |
| Tensile Retention (%) | — | 92 | 82 | 70 |
| Elongation (%) | 80 | 75 | 75 | 75 |
| Microhardness (IRHD) | 70 | 63 | 60 | 56 |

The vulcanizates filled with silane-treated alumina silicates exhibited excellent retention of tensile strength after extended aging as shown by the results in Table IV.

Table IV

High Humidity Aging of a $[(CF_3CH_2O)_2PN-(HCF_2C_3F_6CH_2O)_2PN]_n$ Vulcanizate at 100% Relative Humidity, 212°F (100°C)

| | | | | |
|---|---|---|---|---|
| Copolymer | 100 | | | |
| Burgess KE | 40 | | | |
| Elastomag 170 | 6 | | | |
| Triallylcyanurate | 3 | | | |
| Barium zirconate | 3 | | | |
| Dicup 50 KE | 6 | | | |
| Cure: | | | | |
| Press, 15 min/320°F | | | | |
| Oven, 24 hrs/212°F | | | | |
| HOURS: | 0 | 24 | 168 | 384 | 888 |
| Tensile Strength (psi) | 1750 | — | 1770 | 1680 | 1460 |
| Elongation (%) | 115 | — | 135 | 135 | 145 |
| 100% Modulus (psi) | 1460 | — | 1240 | 1280 | 885 |
| Hardness (IRHD) | 34 | 32 | 52 | 53 | 53 |

Table V presents compositions reflecting the influence of vulcanizate properties when a reactive termonomer which is an unsaturated monovalent radical is added to the polymer backbone.

Table V

| $(CF_3CH_2O)$ | Terpolymer Vulcanizates :$(HCF_2C_3F_6CH_2O)$ 50:49.5:.5 | :Isoeugenol Ratio |
|---|---|---|
| Terpolymer | 100 | 100 | 100 |

Table II

| | I | II | III | IV | V | VI | VII | VIII | IX | X |
|---|---|---|---|---|---|---|---|---|---|---|
| Copolymer | 100 | 100 | 100 | 100 | 100 | 100 | 100 | 100 | 100 | 100 |
| Burgess KE | 100 | — | — | — | — | — | 50 | 40 | 30 | — |
| Nulok 321 SP | — | — | 100 | — | — | — | — | — | — | 40 |
| Silanox 101 | — | 30 | — | — | — | — | — | — | — | — |
| Aerosil 200 | — | — | — | 14.2 | 14.2 | 14.2 | — | — | — | — |
| Elastomag 170 | 6 | 6 | 6 | 6 | 6 | 6 | 6 | — | 6 | — |
| Chemlink 30 | 1.5 | — | — | — | — | 5 | — | — | — | 1.5 |
| Triallyl cyanurate | — | — | 1.5 | — | — | — | 1.5 | 3 | 5 | — |
| Dicup 40 KE | 6 | 6 | 6 | — | — | — | — | 6 | — | 6 |
| Benzoyl Peroxide | — | — | — | 3 | — | 3 | 3 | — | 6 | — |
| SAF Black | — | — | — | — | — | — | — | — | — | 5 |
| Bin Age (days) | 1 | 1 | 1 | 2 | <1 | <1 | 3 | 1 | 39 | <1 |
| CURE | | | | | | | | | | |
| Min/°F | 15/320 | 15/320 | 15/320 | 15/250 | 15/320 | 15/250 | 15/250 | 15/320 | 30/290 | 15/320 |
| Hrs/°F | 24/212 | 24/212 | 24/212 | 24/212 | 24/212 | 24/212 | 24/212 | 24/212 | 24/212 | 24/212 |
| Physical Properties | | | | | | | | | | |
| 100% Modulus (psi) | — | 250 | — | 230 | 500 | 636 | 1350 | 1440 | 1695 | 1100 |
| 200% Modulus (psi) | — | 1050 | — | — | — | — | — | — | — | — |
| Tensile Strength (psi) | 1725 | 2145 | 1660 | 770 | 960 | 1053 | 1350 | 1760 | 1995 | 1825 |
| Elongation (%) | 75 | 305 | 80 | 180 | 150 | 141 | 100 | 110 | 130 | 160 |
| Microhardness (IRHD) | 65 | 39 | 70 | 37 | 41 | 58 | 48 | 30 | 31 | 35 |
| Hardness (Shore A-plied) | 77 | 55 | — | 56 | — | 73 | — | — | — | 60 |
| Compression Set 22 hrs/302°F | — | — | 39 | — | — | 26 | 26 | 26 | 26 | 40 |
| Thermally Aged: 24 hrs/350°F | | | | | | | | | | |
| 100% Modulus (psi) | | 325 | | | | | | | | 900 |
| 200% Modulus (psi) | | 935 | | | | | | | | |
| Tensile Strength (psi) | 750 | 1540 | | | | | | | | 1100 |
| Elongation (%) | 90 | 300 | | | | | | | | 120 |

Table V-continued

| (CF₃CH₂O) | Terpolymer Vulcanizates :(HCF₂C₃F₆CH₂O) 50:49.5:.5 | :Isoeugenol Ratio | |
|---|---|---|---|
| Burgess KE | 100 | — | — |
| Nulock 321SP | — | — | 40 |
| Optiwhite P | — | — | 10 |
| Silanox 101 | — | 30 | 5 |
| Elastomag 170 | 6 | 6 | 6 |
| Chemlink 30 | 1.5 | 1.5 | — |
| Triallylcyanurate | — | — | 1 |
| Luperox 500/40KE | 6 | 6 | 1 |
| Cure: | | | |
| Press, 15 Min/320°F | | | |
| Oven, 24 Hrs/212°F | | | |
| Original Physical Properties: | | | |
| 100% Modulus (psi) | — | — | 1810 |
| Tensile Strength (psi) | 1630 | 1660 | 2190 |
| Elongation (%) | 30 | 55 | 120 |
| Microhardness (IRHD) | 70 | 81 | 38 |
| Compression Set (%) | | | |
| 22 Hrs/302°F | 29 | 44 | 57 |

| (CF₃CH₂O) | :(HCF₂C₃F₆CH₂O) 49.5:49.5:1 | :Hesperetol Ratio | | |
|---|---|---|---|---|
| Terpolymer | 100 | 100 | 100 | 100 |
| Burgess KE | 100 | — | — | — |
| Nulock 321SP | — | — | 40 | 40 |
| SAF Carbon Black (N110) | — | — | — | 10 |
| Silanox 101 | — | 30 | 10 | — |
| Elastomag 170 | 6 | 6 | 6 | 6 |
| Triallylcyanurate | — | — | 3 | 3 |
| Chemlink 30 | 1.5 | 1.5 | — | — |
| Luperox 500/40KE | 3 | 3 | — | 5 |
| Lucidol 78 | — | — | 2 | — |
| Cure: | | | | |
| Press, 15 Min/°F | 320 | 320 | 230 | 320 |
| Oven, 24 Hrs/212°F | | | | |
| Original Physical Properties: | | | | |
| 100% Modulus (psi) | — | 1500 | 1600 | 1300 |
| Tensile Strength (psi) | 1750 | 2200 | 2150 | 2400 |
| Elongation (%) | 90 | 185 | 160 | 210 |
| Microhardness (IRHD) | 71 | 76 | 63 | 68 |
| Compression Set (%) | | | | |
| 22 Hrs/302°F | 26 | 39 | 29 | 27 |

| (CF₃CH₂O) | :(HCF₂C₃F₆CH₂O) 30:67:3 | :Isoeugenol Ratio | |
|---|---|---|---|
| Terpolymer | 100 | 100 | 100 |
| Burgess KE | 100 | — | — |
| Nulock 321SP | — | — | 40 |
| Silanox 101 | — | 30 | 10 |
| Elastomag 170 | 6 | 6 | 6 |
| Chemlink 30 | 1.5 | 1.5 | — |
| Triallylcyanurate | — | — | 3 |
| Luperox 500/4oKE | 1.5 | 1.5 | — |
| Lucidol 78 | — | — | 1 |
| Cure: | | | |
| Press, 15 Min/°F | 320 | 320 | 230 |
| Oven, 24 Hrs/212°F | | | |
| 100% Modulus (psi) | — | 1450 | 1830 |
| Tensile Strength (psi) | 1700 | 1920 | 1950 |
| Elongation (%) | 85 | 165 | 120 |
| Microhardness (IRHD) | 73 | 70 | 69 |
| Compression Set (%) | | | |
| 22 Hrs/302°F | 22 | 40 | 24 |

We claim:

1. A process for the production of thermally stable, fluid resistant vulcanized polyphosphazene copolymers, terpolymers and mixtures thereof which comprises mixing 100 parts by weight of unvulcanized elastomeric polyphosphazene polymer represented as consisting of randomly distributed repeating units having the following formulae

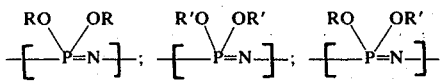

in which OR and OR' are selected from the group consisting of fluoroalkoxy groups represented by the formula Z(CF₂)ₙCH₂O— wherein Z represents H or F and n is an integer between 2 and 9 and aryloxy groups with:

0.1 to 20 parts by weight of a coagent which is at least trifunctional and taken from the class of compounds which contain allyl, vinyl, propenyl, acrylate, or methacrylate moieties on aliphatic or aromatic or heterocyclic nuclei;

20 to 150 parts by weight of a reactive silane treated clay or aluminum silicate filler;

up to 10 parts by weight or metal oxide selected from the group consisting of MgO, ZnO, ZrO₂, or BaZrO₃;

up to 10 parts by weight of a vulcanizing agent selected from the group consisting of benzoyl peroxide, dicumyl peroxide, and 2,5-bis(t-butylperoxy)2,5-dimethylhexane;

and thereafter vulcanizing the resulting composition.

2. The process of claim 1 including in addition curing said vulcanizate at a temperature between 225°F and 350°F for up to 30 minutes.

3. The process of claim 2 including in addition post-curing the cured vulcanizate at a temperature between 150°F and 300°F for up to 24 hours.

4. The product of the process of claim 1.

5. The product of the process of claim 2.

6. The product of the process of claim 3.

7. A vulcanizable composition suitable for the production of thermally stable, fluid resistant articles comprising:

between about 0.1 to 20 parts by weight of a coagent which is at least trifunctional and taken from the class of compounds which contain allyl, vinyl, propenyl, acrylate, or methacrylate moieties on aliphatic or aromatic or heterocyclic nuclei;

20 to 150 parts by weight of a reactive silane treated clay or aluminum silicate filler;

up to 10 parts be weight of metal oxide selected from the group consisting of MgO, ZnO, ZrO₂ or BaZrO₃;

up to 10 parts by weight of a vulcanizing agent selected from the group consisting of benzoyl peroxide, dicumyl peroxide and 2,5-bis(t-butylperoxy)2,5-dimethylhexane; and 100 parts by weight of unvulcanized elastomeric polyphosphazene polymer represented as consisting of randomly distributed repeating units having the following formulae

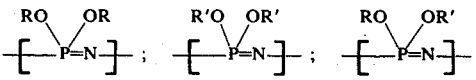

in which OR and OR' are selected from the group consisting of fluoroalkoxy groups represented by the formula Z(CF₂)ₙCH₂O— wherein Z represents H or F and n is an integer between 2 and 9 and aryloxy groups.

8. The composition of claim 7 in which the coagent is triallylcyanurate, and the amount of coagent is 1 to 5 parts by weight per hundred parts of polyphosphazene polymer.

9. The composition of claim 7 in which the coagent is trimethylol propane trimethacrylate and the amount of coagent is 1 to 5 parts by weight per hundred parts of polyphosphazene polymer.

10. The composition of claim 7 in which the reinforcing filler is treated with gamma aminopropyltriethoxysilane from 0.01 to 5 weight percent on the reinforcing filler.

11. The composition of claim 7 in which the reinforcing filler is clay which has been treated with vinyltrismethoxyethoxysilane.

12. The composition of claim 7 in which the polyphosphazene contains the moieties $CF_3CH_2O-$:$HCF_2CF_2CF_2CF_2CH_2O-$: isoeugenol in the ratio of ranges defined by the area bounded by the ternary coordinates, respectively, 67:28:5; 28:67:5; 49.99:49.99:0.02.

13. The compositional range of claim 12 where the isoeugenol is replaced by a monovalent aryloxy radical taken from the group consisting of aryloxy radicals substituted with a substitutent selected from allyl, vinyl and propenyl substituents in the ortho, meta or para positions on said aryloxy groups.

14. The composition of claim 7 wherein the polyphosphazene material comprises poly(fluoroalkoxyphosphazene).

15. The composition of claim 14 wherein the polyphosphazene is a copolymer represented by the formula

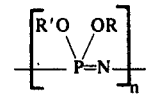

in which OR and OR' are randomly distributed and in which OR represents $OCH_2CF_3$ and OR' represents $OCH_2CF_2CF_2CF_2$.

16. The product of claim 4 in the form of a gasket or seal.

17. The product of claim 4 in the form of an O-ring.

18. The product of claim 5 in the form of a gasket or seal.

19. The product of claim 5 in the form of an O-ring.

* * * * *